United States Patent
Li et al.

(10) Patent No.: US 12,191,937 B2
(45) Date of Patent: Jan. 7, 2025

(54) INFORMATION FEEDBACK METHOD AND DEVICE, INFORMATION RECEIVING METHOD AND DEVICE, AND STORAGE MEDIUM

(71) Applicant: ZTE Corporation, Guangdong (CN)

(72) Inventors: Yong Li, Guangdong (CN); Hao Wu, Guangdong (CN); Guozeng Zheng, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 421 days.

(21) Appl. No.: 17/635,977

(22) PCT Filed: Aug. 13, 2020

(86) PCT No.: PCT/CN2020/108895
§ 371 (c)(1),
(2) Date: Feb. 16, 2022

(87) PCT Pub. No.: WO2021/031972
PCT Pub. Date: Feb. 25, 2021

(65) Prior Publication Data
US 2022/0294499 A1    Sep. 15, 2022

(30) Foreign Application Priority Data
Aug. 16, 2019   (CN) .......................... 201910760870.1

(51) Int. Cl.
*H04B 7/0417* (2017.01)
*H04B 7/06* (2006.01)

(52) U.S. Cl.
CPC ......... *H04B 7/0417* (2013.01); *H04B 7/0626* (2013.01); *H04B 7/0639* (2013.01)

(58) Field of Classification Search
CPC .. H04B 7/0417; H04B 7/0456; H04B 7/0619; H04B 7/0632; H04B 7/0639; H04B 7/046–0487; H04B 7/0626–0634
See application file for complete search history.

(56) References Cited

U.S. PATENT DOCUMENTS

| | | | |
|---|---|---|---|
| 2012/0320862 A1* | 12/2012 | Ko | H04B 7/063 370/329 |
| 2013/0188591 A1* | 7/2013 | Ko | H04B 7/0632 370/329 |

(Continued)

FOREIGN PATENT DOCUMENTS

| | | |
|---|---|---|
| CN | 101931513 A | 12/2010 |
| CN | 102638337 A | 8/2012 |

(Continued)

OTHER PUBLICATIONS

International Search Report mailed Nov. 18, 2020 in connection with International Application No. PCT/CN2020/108895.

(Continued)

*Primary Examiner* — Thomas R Cairns
(74) *Attorney, Agent, or Firm* — Wolf, Greenfield & Sacks, P.C.

(57) ABSTRACT

Provided are an information feedback method and device, an information receiving method and device, and a storage medium. The information feedback method includes the following. Configuration information from a first communication node is received. Precoding matrix information is determined according to the configuration information, where a target frequency band of the precoding matrix information is determined through indication information of a precoding matrix information subband, and the precoding matrix information subband is determined according to the (Continued)

configuration information. The precoding matrix information is fed back to the first communication node.

18 Claims, 3 Drawing Sheets

(56) References Cited

U.S. PATENT DOCUMENTS

| | | | |
|---|---|---|---|
| 2015/0327246 A1 | 11/2015 | Kim et al. | |
| 2016/0065291 A1* | 3/2016 | Jitsukawa | H04B 7/0617 |
| | | | 370/329 |
| 2016/0241324 A1* | 8/2016 | Blankenship | H04L 41/12 |
| 2016/0269089 A1* | 9/2016 | Liu | H04W 72/0446 |
| 2017/0353222 A1* | 12/2017 | Wei | H04W 72/23 |
| 2019/0074884 A1 | 3/2019 | Chen et al. | |
| 2019/0149214 A1 | 5/2019 | Rahman et al. | |
| 2019/0222269 A1* | 7/2019 | Cui | H04L 1/20 |
| 2019/0229786 A1* | 7/2019 | Huang | H04B 7/06 |
| 2020/0235796 A1* | 7/2020 | Wu | H04B 7/0639 |
| 2021/0111853 A1* | 4/2021 | Onggosanusi | H04B 7/0417 |
| 2022/0271814 A1* | 8/2022 | Hao | H04L 5/0053 |

FOREIGN PATENT DOCUMENTS

| | | |
|---|---|---|
| CN | 102801498 A | 11/2012 |
| CN | 104488210 A | 4/2015 |
| CN | 104854902 A | 8/2015 |
| CN | 108270538 A | 7/2018 |
| CN | 108601084 A | 9/2018 |
| CN | 109690962 A | 4/2019 |
| CN | 110535509 A | 12/2019 |
| WO | WO 2016-015225 A1 | 2/2016 |
| WO | WO 2020/091665 A1 | 5/2020 |

OTHER PUBLICATIONS

[No Author Listed], Control signaling to support Rel. 10 feedback framework. 3GPP TSG RAN WG1 Meeting #61bis. R1-103667. Samsung. Jul. 2, 2010. 13 pages.

Extended European Search Report dated Aug. 14, 2023, for European Application No. 20855390.9-1206.

Taiwan Office Action dated Jul. 31, 2023, in connection with Taiwan Application No. 109127692.

[No Author Listed], CR to 38.214 capturing the RAN1#94bis meeting agreements.Nokia.Oct. 8-12, 2018.3GPP TSG-RAN1. R1-1812093. 99 pages.

Chinese Search Report dated Mar. 28, 2024, in connection with Chinese Application No. 2019107608701, and English translation thereof.

Chinese Office Action dated Mar. 28, 2024, in connection with Chinese Application No. 2019107608701, and English translation thereof.

\* cited by examiner

INFORMATION FEEDBACK METHOD AND DEVICE, INFORMATION RECEIVING METHOD AND DEVICE, AND STORAGE MEDIUM

RELATED APPLICATIONS

This Application is a national stage filing under 35 U.S.C. 371 of International Patent Application Serial No. PCT/CN2020/108895, filed Aug. 13, 2020, entitled INFORMATION FEEDBACK METHOD AND DEVICE, INFORMATION RECEIVING METHOD AND DEVICE, AND STORAGE MEDIUM. Foreign priority benefits are claimed under 35 U.S.C. § 119 (a)-(d) or 35 U.S.C. § 365 (b) to Chinese Patent Application No. 201910760870.1, filed with the China National Intellectual Property Administration (CNIPA) on Aug. 16, 2019. The disclosures of these applications are incorporated herein by reference in their entirety.

TECHNICAL FIELD

The present application relates to a wireless communication network, for example, an information feedback method and device, an information receiving method and device, and a storage medium.

BACKGROUND

With the development of society and technology, the amount of data of wireless communication is increasing, which poses an increasing demand for communication efficiency. However, mechanisms of channel state sending and reception between communication nodes cannot satisfy the requirements for high communication efficiency.

SUMMARY

The present application provides an information feedback method and device, an information receiving method and device, and a storage medium for improving wireless communication efficiency.

An embodiment of the present application provides an information feedback method. The method includes the following.

Configuration information from a first communication node is received.

Precoding matrix information is determined according to the configuration information, where a target frequency band of the precoding matrix information is determined through indication information of a precoding matrix information subband, and the precoding matrix information subband is determined according to the configuration information.

The precoding matrix information is fed back to the first communication node.

An embodiment of the present application provides an information receiving method. The method includes the following.

Configuration information is sent to a second communication node.

Precoding matrix information fed back from the second communication node is received, where a target frequency band of the precoding matrix information is determined through indication information of a precoding matrix information subband, and the precoding matrix information subband is determined according to the configuration information.

An embodiment of the present application provides an information feedback device. The device includes a first reception module, a determination module and a feedback module.

The first reception module is configured to receive configuration information from a first communication node.

The determination module is configured to determine precoding matrix information according to the configuration information, where a target frequency band of the precoding matrix information is determined through indication information of a precoding matrix information subband, and the precoding matrix information subband is determined according to the configuration information.

The feedback module is configured to feed back the precoding matrix information to the first communication node.

An embodiment of the present application provides an information receiving device. The device includes a sending module and a second reception module.

The sending module is configured to send configuration information to a second communication node.

The second reception module is configured to receive precoding matrix information fed back from the second communication node, where a target frequency band of the precoding matrix information is determined through indication information of a precoding matrix information subband, and the precoding matrix information subband is determined according to the configuration information.

An embodiment of the present application provides a second communication node. The second communication node includes one or more processors and a memory configured to store one or more programs.

When executed by the one or more processors, the one or more programs cause the one or more processors to implement the preceding information feedback method.

An embodiment of the present application provides a first communication node. The first communication node includes one or more processors and a memory configured to store one or more programs.

When executed by the one or more processors, the one or more programs cause the one or more processors to implement the preceding information receiving method.

An embodiment of the present application provides a storage medium. The storage medium is configured to store a computer program which, when executed by a processor, implements any method of embodiments of the present application.

DETAILED DESCRIPTION

Embodiments of the present application are described hereinafter in detail in conjunction with the drawings.

Figure 1:
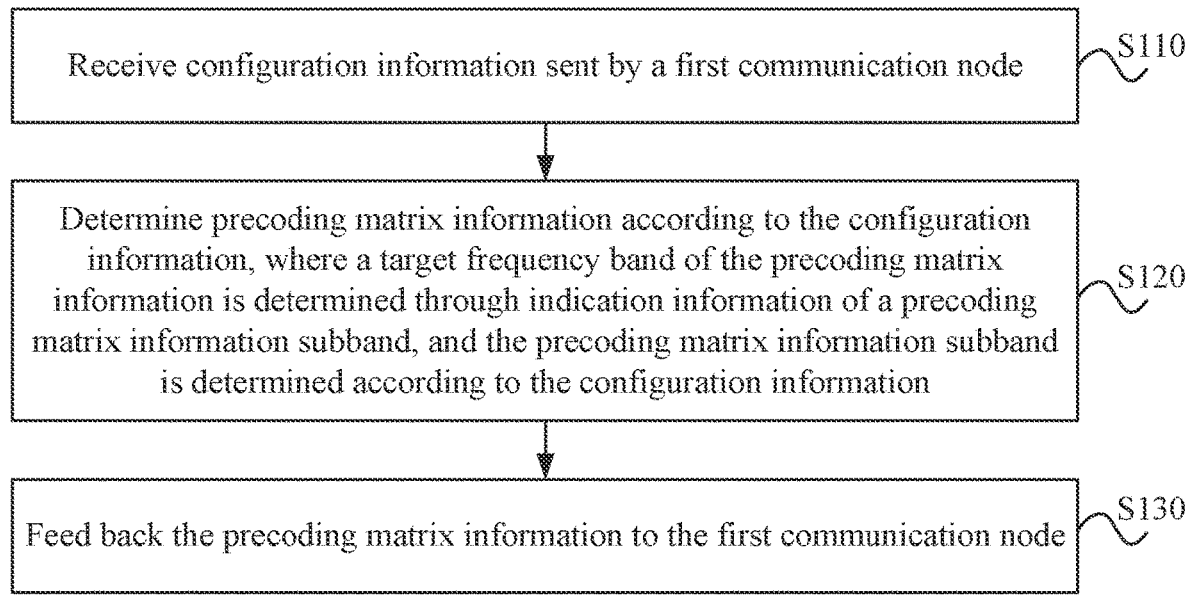
FIG. 1 is a flowchart of an information feedback method according to the present application.

In an exemplary implementation, FIG. 1 is a flowchart of an information feedback method according to the present application. The method may be applied to the case where a second communication node feeds back precoding matrix information according to configuration information sent by a first communication node. This method may be executed by an information feedback device provided by the present application, and the information feedback device may be implemented by software and/or hardware and integrated on the second communication node.

The technical solutions of the present application may be applied to various communication systems such as the Global System for Mobile Communications (GSM), the code-division multiple access (CDMA) system, the wideband code-division multiple access (WCDMA) system, General Packet Radio Service (GPRS), the Long Term Evolution (LTE) system, the Long Term Evolution Advanced (LIE-A) system, the Universal Mobile Telecommunications System (UMTS) and the 5th generation mobile communication (5G) system, and the embodiments of the present application are not limited.

The embodiments of the present application may be applied to wireless networks of different formats. Radio access networks may include different communication nodes in different systems. For two communication nodes of a wireless network, the first communication node transmits a signal to the second communication node, the second communication node feeds back channel state information to the first communication node, and the first communication node determines a transmission scheme according to the received channel state information, so that the efficiency of signal transmission is improved.

Figure 2:
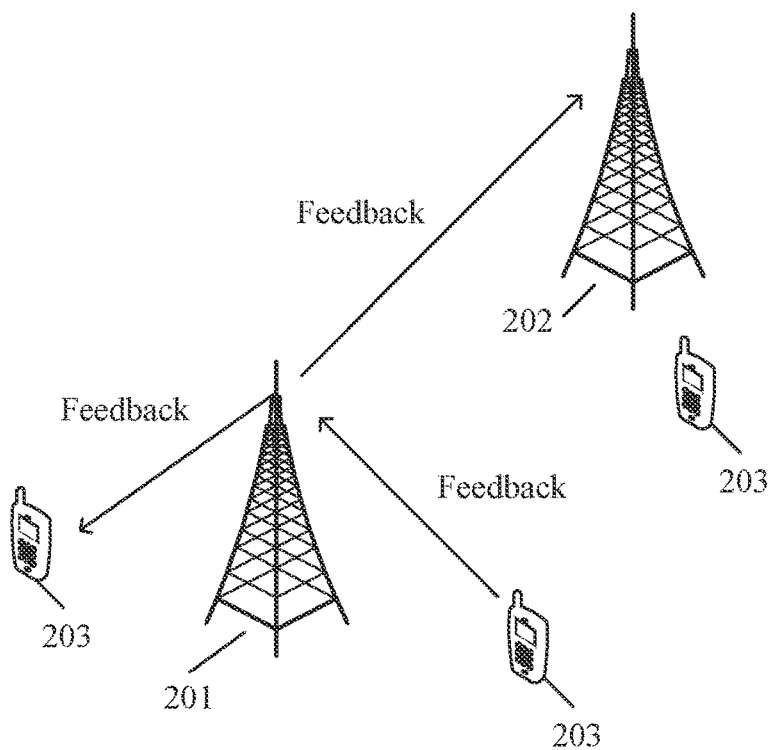
FIG. 2 is a structural diagram of a wireless network according to the present application.

FIG. 2 is a structural diagram of a wireless network according to the present application. As shown in FIG. 2, the wireless network includes at least two base stations, that is, the first base station 201 and the second base station 202, and multiple terminals 203 connected to the base stations. The case where the first communication node transmits a signal to the second communication node, and the second communication node feeds back channel state information to the first communication node may be that the first base station 201 transmits a signal to a terminal 203, and the terminal 203 feeds back channel state information to the first base station 201. Alternatively, the first base station 201 transmits a signal to the second base station 202, and the second base station 202 feeds back channel state information to the first base station 201.

Figure 3:
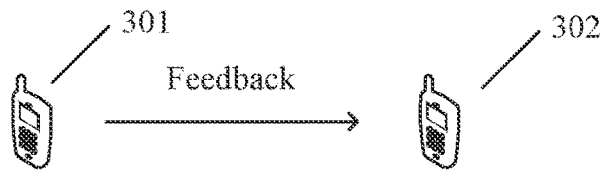
FIG. 3 is a structural diagram of another wireless network according to the present application.

FIG. 3 is a structural diagram of another wireless network according to the present application. As shown in FIG. 3, the wireless network includes at least two terminals, that is, the first terminal 301 and the second terminal 302. The case where the first communication node transmits a signal to the second communication node, and the second communication node feeds back channel state information to the first communication node may be that the first terminal 301 transmits a signal to the second terminal 302, and the second terminal 302 feeds back channel state information to the first terminal 301.

In the embodiment, the base station may be a device capable of communicating with the terminals. The base station may be any device having radio transceiving functions and includes, but is not limited to, a NodeB, an evolved NodeB (eNodeB), a base station in the 5G communication system, a base station in a future communication system, an access node in a Wi-Fi system, a wireless relay node and a wireless backhaul node. The base station may also be a radio controller in a cloud radio access network (C-RAN) scene; and the base station may also be a small cell and a transmission node, and the embodiment of the present application is not limited.

The terminal is a device having radio transceiving functions. The device may be deployed on land, for example, the device is deployed in indoor or outdoor, or the device may be a handled device, a wearable device or a vehicle-mounted device. The device may also be deployed on water (such as in ships). The device may also be deployed in the air (such as in airplanes, balloons and satellites). The terminal may be a mobile phone, a tablet computer, a computer having radio transceiving functions, a virtual reality (VR) terminal, an augmented reality (AR) terminal, a wireless terminal in industrial control, a wireless terminal in self driving, a wireless terminal in remote medicine, a wireless terminal in a smart grid, a wireless terminal in transportation safety, a wireless terminal in a smart city and a wireless terminal in a smart home. The application scenes are not limited in the embodiments of the present application. The terminal may also sometimes be referred to as a user equipment (UE), an access terminal, a UE unit, a UE station, a mobile station, a mobile platform, a remote station, a remote terminal, a mobile device, a UE terminal, a wireless communication device, a UE agent or a UE device.

In wireless communication, the first communication node transmits multiple layers of signals to the second communication node in a space-division multiplexing manner, which improves the communication efficiency. The first communication node maps signals to an antenna port through a precoding matrix for transmission to transmit multiple layers of signals, so that each layer of signals transmitted corresponds to a respective column vector in the precoding matrix. In one particular case, the first communication node transmits a layer of signals to the second communication node. The first communication node determines a transmission scheme of space-division multiplexing according to the received channel state information fed back from the second communication node. The channel state information fed back by the second communication node includes information of the precoding matrix.

As shown in FIG. 1, an information feedback method provided by the present application includes S110, S120 and S130.

In S110, configuration information from a first communication node is received.

In S120, precoding matrix information is determined according to the configuration information, where a target frequency band of the precoding matrix information is determined through indication information of a precoding matrix information subband, and the precoding matrix information subband is determined according to the configuration information.

In S130, the precoding matrix information is fed back to the first communication node.

The information feedback method in the embodiment may be understood as a feedback method for channel state information, and the information feedback method provided by the embodiment is applied to a second communication node. The channel state information includes the precoding matrix information, channel quality indication information or channel strength information.

In the embodiment, the target frequency band of the precoding matrix information refers to an applicable frequency band of the precoding matrix information, that is, the precoding matrix information is fed back for the target frequency band of the precoding matrix information.

The configuration information may be understood as information for determining the channel state information. The configuration information is sent by the first communication node to the second communication node. The configuration information includes a target frequency band of the channel state information. The target frequency band of the channel state information refers to an applicable frequency band of another channel state information than the precoding matrix information, that is, the other channel state information is fed back for the target frequency band of the channel state information. The other channel state information includes the channel quality indication information, the channel strength information and so on. The target frequency band of the channel state information is determined through indication information of a channel state information subband, and the target frequency band of the channel state information is composed of one or more channel state information subbands. A channel state information subband is a continuous segment of frequency band on a bandwidth part (BWP), and the BWP is divided into multiple precoding matrix information subbands.

A precoding matrix information subband is a continuous segment of frequency band on a bandwidth part (BWP), and the BWP is divided into multiple precoding matrix information subbands. The target frequency band of the precoding matrix information is determined through indication information of a precoding matrix information subband, that is, the target frequency band of the precoding matrix information is composed of one or more precoding matrix information subbands.

The BWP is a continuous segment of frequency band in an operating carrier, and the second communication node is in an active or inactive state in units of the bandwidth part.

The correlation of a precoding matrix in a frequency domain is inconsistent with the correlation of another channel state in the frequency domain. The precoding matrix uses a first frequency domain granularity to indicate the target frequency band of precoding matrix information, and the other channel state uses a second frequency domain granularity to indicate the target frequency band of channel state information. The first frequency domain granularity and the second frequency domain granularity are different frequency domain granularities. In this way, the precoding matrix information and the other channel state information can be adapted to the respective correlations.

For example, when the correlation of the precoding matrix in the frequency domain is less than the correlation of a channel quality in the frequency domain, the frequency domain granularity applicable to the precoding matrix is less than the frequency domain granularity applicable to the channel quality. If the precoding matrix adopts the frequency domain granularity applicable to the channel quality, the accuracy of the fed-back precoding matrix decreases. If the channel quality adopts the frequency domain granularity applicable to the precoding matrix, feeding back the channel quality needs excessive resource overhead.

The target frequency band of the channel state information is indicated by a channel state information subband, and the target frequency band of the precoding matrix information is indicated by a precoding matrix information subband, so that the other channel state information and the precoding matrix information can be fed back by using different frequency domain granularities. In this way, the overhead is saved, and both the accuracy of other channel state information and the accuracy of the precoding matrix are improved at the same time.

In an exemplary implementation, the precoding matrix information subband is configured in the channel state information subband.

For example, a first precoding matrix information subband within a bandwidth part is included within a first channel state information subband within the bandwidth part. The first precoding matrix information subband refers to the first one of precoding matrix information subbands in a broadband block, and the first channel state information subband within the bandwidth part refers to the first one of channel state information subbands in the same broadband block.

For another example, a last precoding matrix information subband is included within a last channel state information subband within the bandwidth part. The last precoding matrix information subband refers to the last one of precoding matrix information subbands in a broadband block, and the last channel state information subband within the bandwidth part refers to the last one of channel state information subbands in the same broadband block.

For another example, all precoding matrix information subbands within the bandwidth part are included within respective channel state information subbands within the bandwidth part corresponding to the all precoding subbands.

The precoding matrix information subband is included in the channel state information subband, so that in the channel state information subband, the precoding matrix under the precoding matrix information subband can correspond to some of channel states of the channel state information subband, and the precoding matrix under the precoding matrix information subband can be avoided to correspond to some of channel states of another channel state information subband which does include the precoding matrix information subband. Therefore, the complexity of the second communication node determining the other channel state is reduced, and the complexity of the first communication node determining a signal transmission scheme according to the channel state information is also reduced.

In an exemplary implementation, the precoding matrix information subband being determined according to the configuration information includes the following. The width of the precoding matrix information subband is determined according to the width of the channel state information subband.

The width of a subband refers to the frequency difference between the highest frequency and the lowest frequency within the subband, that is, the bandwidth of the subband or the size of the subband.

For example, the width of a first precoding matrix information subband within a bandwidth part is determined according to the width of a first channel state information subband within the bandwidth part, which is conducive to including the first precoding matrix information subband in the first channel state information subband.

For another example, the width of a last precoding matrix information subband within a bandwidth part is determined according to the size of a last channel state information subband within the bandwidth part, which is conducive to including the last precoding matrix information subband in the last channel state information subband.

For another example, the width of a precoding matrix information subband within a bandwidth part is determined according to the width of a channel state information subband of the precoding matrix information subband included within the bandwidth part, which is conducive to including the precoding matrix information subband in the corresponding channel state information subband.

The width of each channel state information subband within a bandwidth part may be inconsistent with each other, and the width of each precoding matrix information subband within the bandwidth part may be inconsistent with each other. The width of a precoding matrix information subband within the bandwidth part is determined according to the width of a channel state information subband of the precoding matrix information subband included within the bandwidth part, which is conducive to including the precoding matrix information subband in the corresponding channel state information subband.

In an exemplary implementation, the width of the precoding matrix information subband being determined according to the width of the channel state information subband includes the following. The width of a first precoding matrix information subband within a bandwidth part is determined according to the width of a first channel state information subband within the bandwidth part, where the bandwidth part includes one or more subbands.

In an exemplary implementation, the width of the first precoding matrix information subband within the bandwidth part being determined according to the width of the first channel state information subband within the bandwidth part includes the following. The width of the first precoding matrix information subband within the bandwidth part is configured to be equal to the width of the first channel state information subband within the bandwidth part.

The width of the first precoding matrix information subband within the bandwidth part is equal to the width of the first channel state information subband within the bandwidth part. In this way, the first precoding matrix information subband within the bandwidth part is included in the first channel state information subband within the bandwidth part, which is conducive to including another precoding matrix information subband in the corresponding channel state information subband.

In an exemplary implementation, the width of the first precoding matrix information subband within the bandwidth part being determined according to the width of the first channel state information subband within the bandwidth part includes the following. The width of the first precoding matrix information subband within the bandwidth part is determined according to a comparison result between the width of the first channel state information subband within the bandwidth part and the width of a middle precoding matrix information subband, where the middle precoding matrix information subband is a precoding matrix information subband within the bandwidth part, and the middle precoding matrix information subband is a non-first precoding matrix information subband and a non-last precoding matrix information subband.

For example, if the width of the first channel state information subband within the bandwidth part is less than or equal to the width of the middle precoding matrix information subband, the width of the first precoding matrix information subband within the bandwidth part is equal to the width of the first channel state information subband within the bandwidth part.

For another example, if the width of the first channel state information subband within the bandwidth part is greater than the width of the middle precoding matrix information subband, the width of the first precoding matrix information subband within the bandwidth part is equal to the difference between the width of the first channel state information subband within the bandwidth part and the width of another precoding matrix information subband.

For another example, if the width of the first channel state information subband within the bandwidth part is less than or equal to the product of the width of the middle precoding matrix information subband and a predefined coefficient, the width of the first precoding matrix information subband within the bandwidth part is equal to the width of the first channel state information subband within the bandwidth part.

For another example, if the width of the first channel state information subband within the bandwidth part is greater than the product of the width of the middle precoding matrix information subband and a predefined coefficient, the width of the first precoding matrix information subband within the bandwidth part is equal to the difference between the width of the first channel state information subband within the bandwidth part and the width of the middle precoding matrix information subband.

For another example, if the width of the first channel state information subband within the bandwidth part is less than or equal to the product of the width of the middle precoding matrix information subband and a predefined coefficient, the width of the first precoding matrix information subband within the bandwidth part is equal to the sum of the width of the first channel state information subband within the bandwidth part and the width of the middle precoding matrix information subband.

For another example, if the width of the first channel state information subband within the bandwidth part is less than or equal to the sum of the width of the middle precoding matrix information subband and a predefined width, the width of the first precoding matrix information subband within the bandwidth part is equal to the width of the first channel state information subband within the bandwidth part.

For another example, if the width of the first channel state information subband within the bandwidth part is greater than the sum of the width of the middle precoding matrix information subband and a predefined width, the width of the first precoding matrix information subband within the bandwidth part is equal to the difference between the width of the first channel state information subband within the bandwidth part and the width of the middle precoding matrix information subband.

For another example, if the width of the first channel state information subband within the bandwidth part is less than or equal to the sum of the width of the middle precoding matrix information subband and a predefined width, the width of the first precoding matrix information subband within the bandwidth part is equal to the sum of the width of the first channel state information subband within the bandwidth part and the width of the middle precoding matrix information subband.

For another example, the width of the first precoding matrix information subband within the bandwidth part is determined according to the modulo operation of the width of the first channel state information subband and the width of the middle precoding matrix information subband, where the dividend of the modulo operation is the width of the first channel state information subband, and the divisor of the modulo operation is the width of the middle precoding matrix information subband.

In an exemplary implementation, the width of the first precoding matrix information subband within the bandwidth part being determined according to the width of the first channel state information subband within the bandwidth part includes the following. The width of the first precoding matrix information subband within the bandwidth part is determined according to a comparison result between the width of the first channel state information subband within the bandwidth part and the width of a middle channel state information subband, where the middle channel state information subband is a channel state information subband within the bandwidth part, and the middle channel state information subband is a non-first channel state information subband and a non-last channel state information subband. In this way, it is avoided that the width of the first one of precoding matrix information subbands is too greater or too less than a predefined frequency domain granularity, so as to ensure the equalization of the width of the precoding matrix information subband.

For example, if the width of the first channel state information subband within the bandwidth part is less than or equal to the product of the width of the middle channel state information subband and a predefined coefficient, the width of the first precoding matrix information subband within the bandwidth part is equal to the width of the first channel state information subband within the bandwidth part.

For another example, if the width of the first channel state information subband within the bandwidth part is greater than the product of the width of the middle channel state information subband and a predefined coefficient, the width of the first precoding matrix information subband within the bandwidth part is equal to the difference between the width of the first channel state information subband within the bandwidth part and the product.

For another example, if the width of the first channel state information subband within the bandwidth part is less than or equal to the product of the width of the middle channel state information subband and a predefined coefficient, the width of the first precoding matrix information subband within the bandwidth part is equal to the sum of the width of the first channel state information subband within the bandwidth part and the product.

It should be noted that the product of the width of the middle channel state information subband and the predefined coefficient is the predefined frequency domain granularity. The frequency domain granularity is associated with the width of the middle channel state information subband, and the difference associated with the width of the middle channel state information subband may be adjusted by a predefined coefficient. The width of the middle channel state information subband may be the width of the channel state information subband configured by the first communication node.

For another example, the width of the first precoding matrix information subband within the bandwidth part is determined according to the modulo operation of the width of the first channel state information subband and a predefined frequency domain granularity, where the dividend of the modulo operation is the width of the first channel state information subband, and the divisor of the modulo operation is the predefined frequency domain granularity.

In an exemplary implementation, the width of the precoding matrix information subband being determined according to the width of the channel state information subband includes the following. The width of a last precoding matrix information subband within a bandwidth part is determined according to the width of a last channel state information subband within the bandwidth part.

For example, the width of the last precoding matrix information subband within the bandwidth part is configured to be equal to the width of the last channel state information subband within the bandwidth part. In this way, the last precoding matrix information subband within the bandwidth part is included in the last channel state information subband within the bandwidth part, which is conducive to including a middle precoding matrix information subband in the corresponding channel state information subband.

For another example, the width of the last precoding matrix information subband within the bandwidth part is determined according to a comparison result between the width of the last channel state information subband within the bandwidth part and the width of a middle precoding matrix information subband. The middle precoding matrix information subband is a precoding matrix information subband within the bandwidth part, and the middle precoding matrix information subband is not the first one of precoding matrix information subbands and not the last precoding matrix information subband. In this way, it is avoided that the width of the last precoding matrix information subband is too greater or too less than the width of the middle precoding matrix information subband, so as to ensure the equalization of the width of the precoding matrix information subband.

In an exemplary implementation, the width of the last precoding matrix information subband within the bandwidth part being determined according to the width of the last channel state information subband within the bandwidth part includes the following. The width of the last precoding matrix information subband within the bandwidth part is configured to be equal to the width of the last channel state information subband within the bandwidth part.

In an exemplary implementation, the width of the last precoding matrix information subband within the bandwidth part being determined according to the width of the last channel state information subband within the bandwidth part includes the following. The width of the last precoding matrix information subband within the bandwidth part is determined according to a comparison result between the width of the last channel state information subband within the bandwidth part and the width of a middle channel state information subband.

In this way, it is avoided that the width of the last one of precoding matrix information subbands is too greater or too less than a predefined granularity, so as to ensure the equalization of the width of the precoding matrix information subband.

For example, if the size of the last one of channel state information subbands within the bandwidth part is less than or equal to the product of the size of another channel state information subband and a predefined coefficient, the size of the last one of precoding matrix information subbands within the bandwidth part is equal to the size of the last one of channel state information subbands within the bandwidth part.

For another example, if the width of the last channel state information subband within the bandwidth part is greater than the product of the width of the middle channel state information subband and a predefined coefficient, the width of the last precoding matrix information subband within the bandwidth part is equal to the difference between the width of the last channel state information subband within the bandwidth part and the product.

For another example, if the width of the last channel state information subband within the bandwidth part is less than or equal to the product of the width of the middle channel state information subband and a predefined coefficient, the width of the last precoding matrix information subband within the bandwidth part is equal to the sum of the width of the last channel state information subband within the bandwidth part and the product.

The product of the width of the middle channel state information subband and the predefined coefficient is a predefined frequency domain granularity. The frequency domain granularity is associated with the width of the middle channel state information subband, and the difference associated with the width of the middle channel state information subband may be adjusted by a predefined coefficient. The width of the middle channel state information subband may be the width of the channel state information subband configured by the first communication node.

For another example, the width of the last precoding matrix information subband within the bandwidth part is determined according to the modulo operation of the width of the last channel state information subband and a predefined granularity, where the dividend of the modulo operation is the width of the last channel state information subband, and the divisor of the modulo operation is the predefined granularity.

In an exemplary implementation, the width of the last precoding matrix information subband within the bandwidth part being determined according to the width of the last channel state information subband within the bandwidth part includes the following. The width of the last precoding matrix information subband within the bandwidth part is determined according to a comparison result between the width of the last channel state information subband within the bandwidth part and the width of a middle precoding matrix information subband.

For example, if the width of the last channel state information subband within the bandwidth part is less than or equal to the width of the middle precoding matrix information subband, the width of the last precoding matrix information subband within the bandwidth part is equal to the width of the last channel state information subband within the bandwidth part.

For another example, if the width of the last channel state information subband within the bandwidth part is greater than the width of the middle precoding matrix information subband, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the product of the width of the middle precoding matrix information subband and a predefined coefficient, the width of the last precoding matrix information subband within the bandwidth part is equal to the width of the last channel state information subband within the bandwidth part.

For another example, if the width of the last channel state information subband within the bandwidth part is greater than the product of the width of the middle precoding matrix information subband and a predefined coefficient, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the product of the width of the middle precoding matrix information subband and a predefined coefficient, the width of the last precoding matrix information subband within the bandwidth part is equal to the sum of the width of the last channel state information subband within the bandwidth part and the width of the middle precoding matrix information subband.

For another example, if the width of the last channel state information subband within the bandwidth part is less than or equal to the sum of the width of the middle precoding matrix information subband and a predefined width, the width of the last precoding matrix information subband within the bandwidth part is equal to the width of the last channel state information subband within the bandwidth part.

For another example, if the width of the last channel state information subband within the bandwidth part is greater than the sum of the width of the middle precoding matrix information subband and a predefined width, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the sum of the width of the middle precoding matrix information subband and a predefined width, the width of the last precoding matrix information subband within the bandwidth part is equal to the sum of the width of the last channel state information subband within the bandwidth part and the width of the middle precoding matrix information subband.

For another example, the width of the last precoding matrix information subband within the bandwidth part is determined according to the modulo operation of the width of the last channel state information subband and the width of the middle precoding matrix information subband, where the dividend of the modulo operation is the width of the last channel state information subband, and the divisor of the modulo operation is the width of the middle precoding matrix information subband.

In an exemplary implementation, the configuration information further includes: a frequency domain starting point of a bandwidth part. The precoding matrix information subband being determined according to the configuration information includes the following. The width of a first precoding matrix information subband within the bandwidth part is determined according to the frequency domain starting point of the bandwidth part and the width of a middle precoding matrix information subband.

For example, the width of the first precoding matrix information subband within the bandwidth part is the difference between the size of the middle precoding matrix information subband and a modulo operation result, where the dividend of the modulo operation is a frequency domain starting point of the bandwidth part, and the divisor of the modulo operation is the width of another precoding matrix information subband.

In an exemplary implementation, the configuration information further includes: a frequency domain termination point of a bandwidth part. The precoding matrix information subband being determined according to the configuration information includes the following. The width of a last precoding matrix information subband within the bandwidth part is determined according to the frequency domain termination point of the bandwidth part and the width of a middle precoding matrix information subband.

For example, the width of the last precoding matrix information subband within the bandwidth part is the modulo operation result of a frequency domain termination point of the bandwidth part and the width of the middle precoding matrix information subband, where the dividend of the modulo operation is the frequency domain termination location of the bandwidth part, and the divisor of the modulo operation is the size of another precoding matrix information subband.

For another example, if the preceding modulo operation result is 0, the width of the last precoding matrix information subband within the bandwidth part is the size of the middle precoding matrix information subband.

For another example, if the preceding modulo operation result is not 0, the width of the last precoding matrix information subband within the bandwidth part is the modulo operation result of the frequency domain termination location of the bandwidth part and the size of the middle precoding matrix information subband.

In an exemplary implementation, the configuration information further includes: a configuration density of a reference signal. The precoding matrix information subband being determined according to the configuration information includes the following. The width of the precoding matrix information subband is determined according to the configuration density of the reference signal.

In the embodiment, the configuration density of the reference signal refers to the configuration density of a reference signal of the channel state information associated with a feedback report.

In an exemplary implementation, the width of a first precoding matrix information subband within a bandwidth part is determined according to the configuration density of the reference signal of the channel state information associated with the feedback report.

The second communication node determines and feeds back the channel state information by measuring the reference signal of the channel state information associated with the feedback report. The configuration density of the reference signal is determined by the first communication node.

The width of the first precoding matrix information subband within the bandwidth part is determined according to the configuration density of the reference signal of the channel state information associated with the feedback report, so that the density of a reference signal within the first precoding matrix information subband can be not lower than the configuration density of the reference signal, and the first precoding matrix information subband is kept at a relatively small granularity.

For another example, if the configuration density of the reference signal is equal to 1, the width of the first precoding matrix information subband within the bandwidth part is determined according to a comparison result between the width of a first channel state information subband within the bandwidth part and the width of a middle precoding matrix information subband. The middle precoding matrix information subband is a precoding matrix information subband within the bandwidth part, and the middle precoding matrix information subband is not the first precoding matrix information subband and not a last precoding matrix information subband. In this way, it is avoided that the width of the first precoding matrix information subband is too greater or too less than the width of a middle precoding matrix information subband, so as to ensure the equalization of the width of the precoding matrix information subband.

The width of the first precoding matrix information subband within the bandwidth part is determined according to the comparison result between the width of the first channel state information subband within the bandwidth part and the width of the middle precoding matrix information subband, and an example of the method thereof is described below.

For example, if the width of the first channel state information subband within the bandwidth part is less than or equal to the width of the middle precoding matrix information subband, the width of the first precoding matrix information subband within the bandwidth part is equal to the width of the first channel state information subband within the bandwidth part.

For another example, if the width of the first channel state information subband within the bandwidth part is greater than the width of the middle precoding matrix information subband, the width of the first precoding matrix information subband within the bandwidth part is equal to the difference between the width of the first channel state information subband within the bandwidth part and the width of another precoding matrix information subband.

For another example, if the width of the first channel state information subband within the bandwidth part is less than or equal to the product of the width of the middle precoding matrix information subband and a predefined coefficient, the width of the first precoding matrix information subband within the bandwidth part is equal to the width of the first channel state information subband within the bandwidth part.

For another example, if the width of the first channel state information subband within the bandwidth part is greater than the product of the width of the middle precoding matrix information subband and a predefined coefficient, the width of the first precoding matrix information subband within the bandwidth part is equal to the difference between the width of the first channel state information subband within the bandwidth part and the width of the middle precoding matrix information subband.

For another example, if the width of the first channel state information subband within the bandwidth part is less than or equal to the product of the width of the middle precoding matrix information subband and a predefined coefficient, the width of the first precoding matrix information subband within the bandwidth part is equal to the sum of the width of the first channel state information subband within the bandwidth part and the width of the middle precoding matrix information subband.

For another example, if the width of the first channel state information subband within the bandwidth part is less than or equal to the sum of the width of the middle precoding matrix information subband and a predefined width, the width of the first precoding matrix information subband within the bandwidth part is equal to the width of the first channel state information subband within the bandwidth part.

For another example, if the width of the first channel state information subband within the bandwidth part is greater than the sum of the width of the middle precoding matrix information subband and a predefined width, the width of the first precoding matrix information subband within the bandwidth part is equal to the difference between the width of the first channel state information subband within the bandwidth part and the width of the middle precoding matrix information subband.

For another example, if the width of the first channel state information subband within the bandwidth part is less than or equal to the sum of the width of the middle precoding matrix information subband and a predefined width, the width of the first precoding matrix information subband within the bandwidth part is equal to the sum of the width of the first channel state information subband within the bandwidth part and the width of the middle precoding matrix information subband.

For another example, the width of the first precoding matrix information subband within the bandwidth part is determined according to the modulo operation of the width of the first channel state information subband and the width of the middle precoding matrix information subband, where the dividend of the modulo operation is the width of the first channel state information subband, and the divisor of the modulo operation is the width of the middle precoding matrix information subband.

In the embodiment, if the configuration density of the reference signal is equal to 1, the width of the first precoding matrix information subband within the bandwidth part is the difference between the width of the middle precoding matrix information subband and a modulo operation result, where the dividend of the modulo operation is a frequency domain starting location of the bandwidth part, and the divisor of the modulo operation is the width of the middle precoding matrix information subband.

For example, if the configuration density of the reference signal is less than 1, the width of the first precoding matrix information subband within the bandwidth part is equal to the width of the first channel state information subband within the bandwidth part.

In an exemplary implementation, the width of a last precoding matrix information subband within a bandwidth part is determined according to the configuration density of the reference signal of the channel state information associated with the feedback report.

The second communication node determines and feeds back the channel state information by measuring the reference signal of the channel state information associated with the feedback report. The configuration density of the reference signal is determined by the first communication node.

The width of the last precoding matrix information subband within the bandwidth part is determined according to the configuration density of the reference signal of the channel state information associated with the feedback report, so that the density of a reference signal within the last one of precoding matrix information subbands can be not lower than the configuration density of the reference signal of the channel state information, and the last one of precoding matrix information subbands is kept at a relatively small granularity.

If the configuration density of the reference signal is equal to 1, the width of the last precoding matrix information subband within the bandwidth part is determined according to a comparison result between the width of a last channel state information subband within the bandwidth part and the width of a middle precoding matrix information subband. The middle precoding matrix information subband is a precoding matrix information subband within the bandwidth part, and the middle precoding matrix information subband is not the first one of precoding matrix information subbands and not the last precoding matrix information subband. In this way, it is avoided that the width of the last precoding matrix information subband is too greater or too less than the width of the middle precoding matrix information subband, so as to ensure the equalization of the width of the precoding matrix information subband.

The width of the last precoding matrix information subband within the bandwidth part is determined according to the comparison result between the width of the last channel state information subband within the bandwidth part and the width of the middle precoding matrix information subband, and an example of the method thereof is described below.

For example, if the width of the last channel state information subband within the bandwidth part is less than or equal to the width of the middle precoding matrix information subband, the width of the last precoding matrix information subband within the bandwidth part is equal to the width of the last channel state information subband within the bandwidth part.

For another example, if the width of the last channel state information subband within the bandwidth part is greater than the width of the middle precoding matrix information subband, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the product of the width of the middle precoding matrix information subband and a predefined coefficient, the width of the last precoding matrix information subband within the bandwidth part is equal to the width of the last channel state information subband within the bandwidth part.

For another example, if the width of the last channel state information subband within the bandwidth part is greater than the product of the width of the middle precoding matrix information subband and a predefined coefficient, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the product of the width of the middle precoding matrix information subband and a predefined coefficient, the width of the last precoding matrix information subband within the bandwidth part is equal to the sum of the width of the last channel state information subband within the bandwidth part and the width of the middle precoding matrix information subband.

For another example, if the width of the last channel state information subband within the bandwidth part is less than or equal to the sum of the width of the middle precoding matrix information subband and a predefined width, the width of the last precoding matrix information subband within the bandwidth part is equal to the width of the last channel state information subband within the bandwidth part.

For another example, if the width of the last channel state information subband within the bandwidth part is greater than the sum of the width of the middle precoding matrix information subband and a predefined width, the width of the last precoding matrix information subband within the bandwidth part is equal to the difference between the width of the last channel state information subband within the bandwidth part and the width of the middle precoding matrix information subband.

For another example, if the width of the last channel state information subband within the bandwidth part is less than or equal to the sum of the width of the middle precoding matrix information subband and a predefined width, the width of the last precoding matrix information subband within the bandwidth part is equal to the sum of the width of the last channel state information subband within the bandwidth part and the width of the middle precoding matrix information subband.

For another example, the width of the last precoding matrix information subband within the bandwidth part is determined according to the modulo operation of the width of the last channel state information subband and the width of the middle precoding matrix information subband, where the dividend of the modulo operation is the width of the last channel state information subband, and the divisor of the modulo operation is the width of the middle precoding matrix information subband.

If the configuration density of the reference signal is equal to 1, the width of the last precoding matrix information subband within the bandwidth part is the difference between the width of the middle precoding matrix information subband and a modulo operation result, where the dividend of the modulo operation is a frequency domain starting location of the bandwidth part, and the divisor of the modulo operation is the size of the middle precoding matrix information subband.

For example, if the configuration density of the reference signal is less than 1, the width of the last precoding matrix information subband within the bandwidth part is equal to the width of the last one of channel state information subbands within the bandwidth part.

In an exemplary implementation, the precoding matrix information subband being determined according to the configuration information includes the following. The width of a first precoding matrix information subband within a bandwidth part is determined according to a first-type density of a reference signal, where the first-type density refers to a density of a reference signal within the first precoding matrix information subband determined by a width of a-first type precoding matrix information subband.

The width of the first-type precoding matrix information subband is the difference between the width of a first channel state information subband within the bandwidth part and the width of a middle precoding matrix information subband, or the width of the first-type precoding matrix information subband is the modulo operation result of the width of a first channel state information subband within the bandwidth part and the width of a middle precoding matrix information subband.

In this way, the density of the reference signal within a first precoding matrix information subband can be not lower than the configuration density of the reference signal, and the first one of precoding matrix information subbands is kept at a relatively small granularity.

For example, if the first-type density of the reference signal of the channel state information associated with the feedback report is less than the configuration density of the reference signal of the channel state information associated with the feedback report, the width of the first one of precoding matrix information subbands within the bandwidth part is equal to the width of the first one of channel state information subbands within the bandwidth part.

For example, if the first-type density of the reference signal of the channel state information associated with the feedback report is greater than or equal to the configuration density of the reference signal of the channel state information associated with the feedback report, the width of the first one of precoding matrix information subbands within the bandwidth part is equal to the width of the first-type precoding matrix information subband.

It should be noted that within any precoding matrix information subband, the density of the reference signal of the channel state information is greater than or equal to the configuration density of the reference signal.

In an exemplary implementation, the precoding matrix information subband is obtained by mapping the channel state information subband. One channel state information subband is mapped into an integer number of precoding matrix information subbands.

In an exemplary implementation, the manner of mapping the channel state information subband into the precoding matrix information subband is determined by the location of the channel state information subband in the bandwidth part.

For example, the first one of channel state information subbands within the bandwidth part is mapped into one precoding matrix information subband, the last one of channel state information subbands within the bandwidth part is mapped into one precoding matrix information subband, and other channel state information subbands within the bandwidth part are mapped into M precoding matrix information subbands, where M is determined by a configuration parameter of the first communication node, and M is a positive integer.

For example, the first one of channel state information subbands within the bandwidth part is mapped into F precoding matrix information subbands according to the size of the first one of channel state information subbands, the last one of channel state information subbands within the bandwidth part is mapped into F precoding matrix information subbands according to the size of the last one of channel state information subbands, and other channel state information subbands within the bandwidth part are mapped into M precoding matrix information subbands, where M is determined by a configuration parameter of the first communication node.

In an exemplary implementation, the present application further provides an information receiving method, and the method is applied to a first communication node. The method may be executed by an information receiving device. The information receiving device may be implemented by software and/or hardware and integrated on the first communication node. The method may be applied to the case where the first communication node sends configuration information to and receives feedback information from a second communication node.

Reference may be made to the preceding embodiments for the content that is not detailed in the embodiment, which will not be repeated here.

Figure 4:
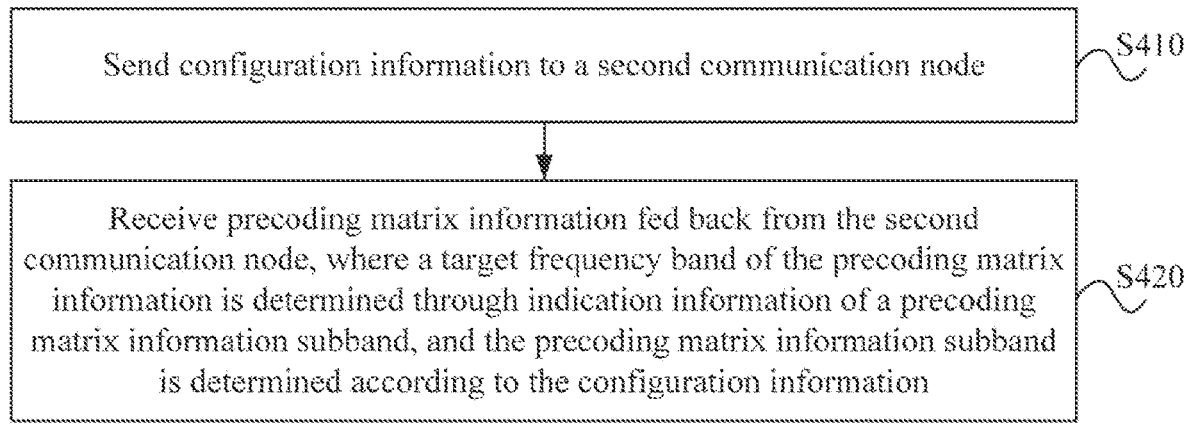
FIG. 4 is a flowchart of an information receiving method according to the present application.

FIG. 4 is a flowchart of an information receiving method according to the present application. As shown in FIG. 4, the information receiving method provided by the present application includes S410 and S420.

In S410, configuration information is sent to a second communication node.

In S420, precoding matrix information fed back by the second communication node is received, where a target frequency band of the precoding matrix information is determined through indication information of a precoding matrix information subband, and the precoding matrix information subband is determined according to the configuration information.

According to the information receiving method provided by the present application, the configuration information is sent to the second communication node, and the precoding matrix information fed back by the second communication node is received, where the target frequency band of the precoding matrix information is determined through the indication information of the precoding matrix information subband, and the precoding matrix information subband is determined according to the configuration information. A target frequency band of channel state information is indicated by a channel state information subband, and the target frequency band of the precoding matrix information is indicated by the precoding matrix information subband, so that other channel state information and the precoding matrix can be fed back by using corresponding frequency domain granularities. In this way, the overhead is saved, and both the accuracy of other channel state information and the accuracy of the precoding matrix are improved at the same time.

On the basis of the preceding embodiments, variant embodiments of the preceding embodiments are proposed, and it is to be noted that here, for the brevity of description, only differences from the preceding embodiments are described in the variant embodiments.

In an exemplary implementation, after the precoding matrix information fed back by the second communication node is received, the method further includes the following. A transmission scheme for to-be-transmitted data is determined according to the precoding matrix information.

In an exemplary implementation, the configuration information includes: a target frequency band of channel state information, where the target frequency band of the channel state information is indicated in a manner of a channel state information subband, and the precoding matrix information subband is within the channel state information subband.

In an exemplary implementation, the precoding matrix information subband being determined according to the configuration information includes the following. The width of the precoding matrix information subband is determined according to the width of the channel state information subband.

In an exemplary implementation, the width of the precoding matrix information subband being determined according to the width of the channel state information subband includes the following. The width of a first precoding matrix information subband within a bandwidth part is determined according to the width of a first channel state information subband within the bandwidth part, where the bandwidth part includes one or more subbands.

In an exemplary implementation, the width of the first precoding matrix information subband within the bandwidth part being determined according to the width of the first channel state information subband within the bandwidth part includes the following. The width of the first precoding matrix information subband within the bandwidth part is configured to be equal to the width of the first channel state information subband within the bandwidth part.

In an exemplary implementation, the width of the first precoding matrix information subband within the bandwidth part being determined according to the width of the first channel state information subband within the bandwidth part includes the following. The width of the first precoding matrix information subband within the bandwidth part is determined according to a comparison result between the width of the first channel state information subband within the bandwidth part and the width of a middle precoding matrix information subband, where the middle precoding matrix information subband is a precoding matrix information subband within the bandwidth part, and the middle precoding matrix information subband is a non-first precoding matrix information subband and a non-last precoding matrix information subband.

In an exemplary implementation, the width of the first precoding matrix information subband within the bandwidth part being determined according to the width of the first channel state information subband within the bandwidth part includes the following. The width of the first precoding matrix information subband within the bandwidth part is determined according to a comparison result between the width of the first channel state information subband within the bandwidth part and the width of a middle channel state information subband, where the middle channel state information subband is a channel state information subband within the bandwidth part, and the middle channel state information subband is a non-first channel state information subband and a non-last channel state information subband.

In an exemplary implementation, the width of the precoding matrix information subband being determined according to the width of the channel state information subband includes the following. The width of a last precoding matrix information subband within a bandwidth part is determined according to the width of a last channel state information subband within the bandwidth part.

In an exemplary implementation, the width of the last precoding matrix information subband within the bandwidth part being determined according to the width of the last channel state information subband within the bandwidth part includes the following. The width of the last precoding matrix information subband within the bandwidth part is configured to be equal to the width of the last channel state information subband within the bandwidth part.

In an exemplary implementation, the width of the last precoding matrix information subband within the bandwidth part being determined according to the width of the last channel state information subband within the bandwidth part includes the following. The width of the last precoding matrix information subband within the bandwidth part is determined according to a comparison result between the width of the last channel state information subband within the bandwidth part and the width of a middle precoding matrix information subband.

In an exemplary implementation, the width of the last precoding matrix information subband within the bandwidth part being determined according to the width of the last channel state information subband within the bandwidth part includes the following. The width of the last precoding matrix information subband within the bandwidth part is determined according to a comparison result between the width of the last channel state information subband within the bandwidth part and the width of a middle channel state information subband.

In an exemplary implementation, the configuration information further includes: a frequency domain starting point of a bandwidth part.

The precoding matrix information subband being determined according to the configuration information includes the following. The width of a first precoding matrix information subband within the bandwidth part is determined according to the frequency domain starting point of the bandwidth part and the width of a middle precoding matrix information subband.

In an exemplary implementation, the configuration information further includes: a frequency domain termination point of a bandwidth part.

The precoding matrix information subband being determined according to the configuration information includes the following. The width of a last precoding matrix information subband within the bandwidth part is determined according to the frequency domain termination point of the bandwidth part and the width of a middle precoding matrix information subband.

In an exemplary implementation, the configuration information further includes: a configuration density of a reference signal.

The precoding matrix information subband being determined according to the configuration information includes the following. The width of the precoding matrix information subband is determined according to the configuration density of the reference signal.

In an exemplary implementation, the precoding matrix information subband being determined according to the configuration information includes the following. The width of a first precoding matrix information subband within a bandwidth part is determined according to a first-type density of a reference signal, where the first-type density refers to a density of a reference signal within the first precoding matrix information subband determined by a width of a first-type precoding matrix information subband.

The width of the first-type precoding matrix information subband is the difference between the width of a first channel state information subband within the bandwidth part and the width of a middle precoding matrix information subband, or the width of the first-type precoding matrix information subband is the modulo operation result of the width of a first channel state information subband within the bandwidth part and the width of a middle precoding matrix information subband.

In an exemplary implementation, the precoding matrix information subband being determined according to the configuration information includes the following. The width of a last precoding matrix information subband within a bandwidth part is determined according to a second-type density of a reference signal, where the second-type density refers to a density of a reference signal within the last precoding matrix information subband determined by a width of a second-type precoding matrix information subband.

The width of the second-type precoding matrix information subband is the difference between the width of a last channel state information subband within the bandwidth part and the width of a middle precoding matrix information subband, or the width of the second-type precoding matrix information subband is the modulo operation result of the width of a last channel state information subband within the bandwidth part and the width of a middle precoding matrix information subband.

In an exemplary implementation, within any precoding matrix information subband, the density of a reference signal of the channel state information is greater than or equal to the configuration density of the reference signal.

In an exemplary implementation, the precoding matrix information subband is obtained by mapping the channel state information subband.

In an exemplary implementation, the manner of mapping the channel state information subband into the precoding matrix information subband is determined by the location of the channel state information subband in the bandwidth part.

Figure 5:
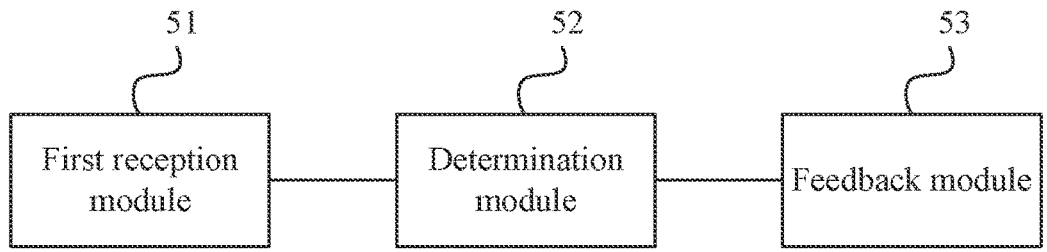
FIG. 5 is a structural diagram of an information feedback device according to the present application.

The present application provides an information feedback device. FIG. 5 is a structural diagram of an information feedback device according to the present application. As shown in FIG. 5, the information feedback device provided by the embodiment of the present application may be integrated on a second communication node. The device includes a first reception module 51, a determination module 52 and a feedback module 53.

The first reception module 51 is configured to receive configuration information sent by a first communication node.

The determination module 52 is configured to determine precoding matrix information according to the configuration information, where a target frequency band of the precoding matrix information is determined through indication information of a precoding matrix information subband, and the precoding matrix information subband is determined according to the configuration information.

The feedback module 53 is configured to feed back the precoding matrix information to the first communication node.

The information feedback device provided by the embodiment is configured to implement the information feedback method of the embodiments of the present application. The implementation principles and technical effects of the information feedback device provided by the embodiment are similar to the implementation principles and technical effects of the information feedback method of the embodiments of the present application, which are not be repeated here.

In an exemplary implementation, the configuration information includes: a target frequency band of channel state information, where the target frequency band of the channel state information is indicated in a manner of a channel state information subband, and the precoding matrix information subband is within the channel state information subband.

In an exemplary implementation, the determination module 52 is configured to determine the width of the precoding matrix information subband according to the width of the channel state information subband.

In an exemplary implementation, the determination module 52 is configured to determine the width of a first precoding matrix information subband within a bandwidth part according to the width of a first channel state information subband within the bandwidth part, where the bandwidth part includes one or more subbands.

In an exemplary implementation, the determination module 52 is configured to configure the width of the first precoding matrix information subband within the bandwidth part to be equal to the width of the first channel state information subband within the bandwidth part.

In an exemplary implementation, the determination module 52 is configured to determine the width of the first precoding matrix information subband within the bandwidth part according to a comparison result between the width of the first channel state information subband within the bandwidth part and the width of a middle precoding matrix information subband, where the middle precoding matrix information subband is a precoding matrix information subband within the bandwidth part, and the middle precoding matrix information subband is a non-first precoding matrix information subband and a non-last precoding matrix information subband.

In an exemplary implementation, the determination module 52 is configured to determine the width of the first precoding matrix information subband within the bandwidth part according to a comparison result between the width of the first channel state information subband within the bandwidth part and the width of a middle channel state information subband, where the middle channel state information subband is a channel state information subband within the bandwidth part, and the middle channel state information subband is a non-first channel state information subband and a non-last channel state information subband.

In an exemplary implementation, the determination module 52 is configured to determine the width of a last precoding matrix information subband within a bandwidth part according to the width of a last channel state information subband within the bandwidth part.

In an exemplary implementation, the determination module 52 is configured to configure the width of the last precoding matrix information subband within the bandwidth part to be equal to the width of the last channel state information subband within the bandwidth part.

In an exemplary implementation, the determination module 52 is configured to determine the width of the last precoding matrix information subband within the bandwidth part according to a comparison result between the width of the last channel state information subband within the bandwidth part and the width of a middle precoding matrix information subband.

In an exemplary implementation, the determination module 52 is configured to determine the width of the last precoding matrix information subband within the bandwidth part according to a comparison result between the width of the last channel state information subband within the bandwidth part and the width of a middle channel state information subband.

In an exemplary implementation, the configuration information further includes: a frequency domain starting point of a bandwidth part.

The determination module 52 is configured to determine the width of a first precoding matrix information subband within the bandwidth part according to the frequency domain starting point of the bandwidth part and the width of a middle precoding matrix information subband.

In an exemplary implementation, the configuration information further includes: a frequency domain termination point of a bandwidth part.

The determination module 52 is configured to determine the width of a last precoding matrix information subband within the bandwidth part according to the frequency domain termination point of the bandwidth part and the width of a middle precoding matrix information subband.

In an exemplary implementation, the configuration information further includes: a configuration density of a reference signal.

The determination module 52 is configured to determine the width of the precoding matrix information subband according to the configuration density of the reference signal.

In an exemplary implementation, the determination module 52 is configured to determine the width of a first precoding matrix information subband within a bandwidth part according to a first-type density of a reference signal, where the first-type density refers to a density of a reference signal within the first precoding matrix information subband determined by a width of a first-type precoding matrix information subband.

The width of the first-type precoding matrix information subband is the difference between the width of a first channel state information subband within the bandwidth part and the width of a middle precoding matrix information subband, or the width of the first-type precoding matrix information subband is the modulo operation result of the width of a first channel state information subband within the bandwidth part and the width of a middle precoding matrix information subband.

In an exemplary implementation, the determination module 52 is configured to determine the width of a last precoding matrix information subband within a bandwidth part according to a second-type density of a reference signal, where the second-type density refers to a density of a reference signal within the last precoding matrix information subband determined by a width of a second-type precoding matrix information subband.

The width of the second-type precoding matrix information subband is the difference between the width of a last channel state information subband within the bandwidth part and the width of a middle precoding matrix information subband, or the width of the second-type precoding matrix information subband is the modulo operation result of the width of a last channel state information subband within the bandwidth part and the width of a middle precoding matrix information subband.

In an exemplary implementation, within any precoding matrix information subband, the density of a reference signal of the channel state information is greater than or equal to the configuration density of the reference signal.

In an exemplary implementation, the precoding matrix information subband is obtained by mapping the channel state information subband.

In an exemplary implementation, the manner of mapping the channel state information subband into the precoding matrix information subband is determined by the location of the channel state information subband in the bandwidth part.

Figure 6:
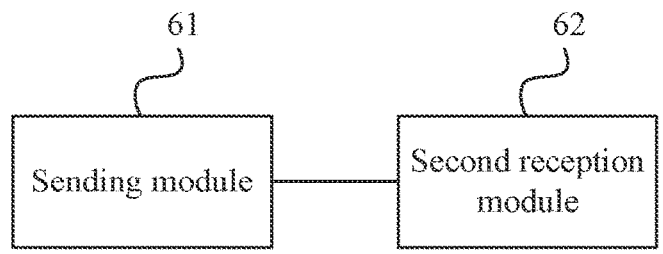
FIG. 6 is a structural diagram of an information receiving device according to the present application.

The present application further provides an information receiving device. FIG. 6 is a structural diagram of an information receiving device according to the present application. As shown in FIG. 6, the information receiving device in the embodiment of the present application may be integrated on a first communication node. The device includes a sending module 61 and a second reception module 62. The sending module 61 is configured to send configuration information to a second communication node. The second reception module 62 is configured to receive precoding matrix information fed back by the second communication node. A target frequency band of the precoding matrix information is determined through indication information of a precoding matrix information subband, and the precoding matrix information subband is determined according to the configuration information.

The information receiving device provided by the embodiment is configured to implement the information receiving method of the embodiments of the present application. The implementation principles and technical effects of the information receiving device provided by the embodiment are similar to the implementation principles and technical effects of the information receiving method of the embodiments of the present application, which are not be repeated here.

In an exemplary implementation, the device further includes an encoder. The encoder is configured to determine a transmission scheme for to-be-transmitted data according to the precoding matrix information.

In an exemplary implementation, the configuration information includes: a target frequency band of channel state information, where the target frequency band of the channel state information is indicated in a manner of a channel state information subband, and the precoding matrix information subband is within the channel state information subband.

In an exemplary implementation, the second reception module 62 is configured to determine the width of the precoding matrix information subband according to the width of the channel state information subband.

In an exemplary implementation, the second reception module 62 is configured to determine the width of a first precoding matrix information subband within a bandwidth part according to the width of a first channel state information subband within the bandwidth part, where the bandwidth part includes one or more subbands.

In an exemplary implementation, the second reception module 62 is configured to configure the width of the first precoding matrix information subband within the bandwidth part to be equal to the width of the first channel state information subband within the bandwidth part.

In an exemplary implementation, the second reception module 62 is configured to determine the width of the first precoding matrix information subband within the bandwidth part according to a comparison result between the width of the first channel state information subband within the bandwidth part and the width of a middle precoding matrix information subband, where the middle precoding matrix information subband is a precoding matrix information subband within the bandwidth part, and the middle precoding matrix information subband is a non-first precoding matrix information subband and a non-last precoding matrix information subband.

In an exemplary implementation, the second reception module 62 is configured to determine the width of the first precoding matrix information subband within the bandwidth part according to a comparison result between the width of the first channel state information subband within the bandwidth part and the width of a middle channel state information subband, where the middle channel state information subband is a channel state information subband within the bandwidth part, and the middle channel state information subband is a non-first channel state information subband and a non-last channel state information subband.

In an exemplary implementation, the second reception module 62 is configured to determine the width of a last precoding matrix information subband within a bandwidth part according to the width of a last channel state information subband within the bandwidth part.

In an exemplary implementation, the second reception module 62 is configured to configure the width of the last precoding matrix information subband within the bandwidth part to be equal to the width of the last channel state information subband within the bandwidth part.

In an exemplary implementation, the second reception module 62 is configured to determine the width of the last precoding matrix information subband within the bandwidth part according to a comparison result between the width of the last channel state information subband within the bandwidth part and the width of a middle precoding matrix information subband.

In an exemplary implementation, the second reception module 62 is configured to determine the width of the last precoding matrix information subband within the bandwidth part according to a comparison result between the width of the last channel state information subband within the bandwidth part and the width of a middle channel state information subband.

In an exemplary implementation, the configuration information further includes: a frequency domain starting point of a bandwidth part.

The second reception module 62 is configured to determine the width of a first precoding matrix information subband within the bandwidth part according to the frequency domain starting point of the bandwidth part and the width of a middle precoding matrix information subband.

In an exemplary implementation, the configuration information further includes: a frequency domain termination point of a bandwidth part.

The second reception module 62 is configured to determine the width of a last precoding matrix information subband within the bandwidth part according to the frequency domain termination point of the bandwidth part and the width of a middle precoding matrix information subband.

In an exemplary implementation, the configuration information further includes: a configuration density of a reference signal.

The second reception module 62 is configured to determine the width of the precoding matrix information subband according to the configuration density of the reference signal.

In an exemplary implementation, the second reception module 62 is configured to determine the width of a first precoding matrix information subband within a bandwidth part according to a first-type density of a reference signal, where the first-type density refers to a density of a reference signal within the first precoding matrix information subband determined by a width of a first-type precoding matrix information subband.

The width of the first-type precoding matrix information subband is the difference between the width of a first channel state information subband within the bandwidth part and the width of a middle precoding matrix information subband, or the width of the first-type precoding matrix information subband is the modulo operation result of the width of a first channel state information subband within the bandwidth part and the width of a middle precoding matrix information subband.

In an exemplary implementation, the second reception module 62 is configured to determine the width of a last precoding matrix information subband within a bandwidth part according to a second-type density of a reference signal, where the second-type density refers to a density of a reference signal within the last precoding matrix information subband determined by a width of a second-type precoding matrix information subband.

The width of the second-type precoding matrix information subband is the difference between the width of a last channel state information subband within the bandwidth part and the width of a middle precoding matrix information subband, or the width of the second-type precoding matrix information subband is the modulo operation result of the width of a last channel state information subband within the bandwidth part and the width of a middle precoding matrix information subband.

In an exemplary implementation, within any precoding matrix information subband, the density of a reference signal of the channel state information is greater than or equal to the configuration density of the reference signal.

In an exemplary implementation, the precoding matrix information subband is obtained by mapping the channel state information subband.

In an exemplary implementation, the manner of mapping the channel state information subband into the precoding matrix information subband is determined by the location of the channel state information subband in the bandwidth part.

Figure 7:
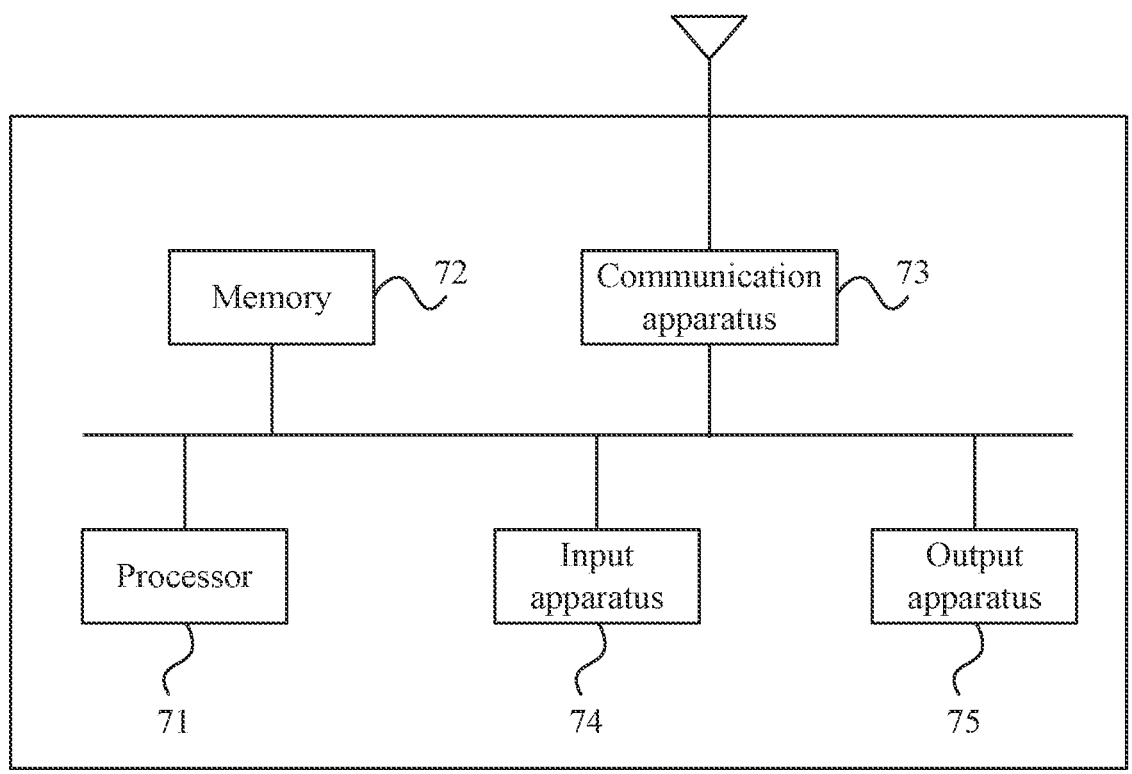
FIG. 7 is a structural diagram of a second communication node according to the present application.

The embodiment of the present application further provides a second communication node. FIG. 7 is a structural diagram of a second communication node according to the present application. As shown in FIG. 7, the second communication node provided by the present application includes one or more processors 71 and a memory 72. One or more processors 71 may be provided in the second communication node, and one processor 71 is taken as an example in FIG. 7. The memory 72 is configured to store one or more programs. The one or more programs, when executed by the one or more processors 71, cause the one or more processors 71 to implement the information feedback method of the embodiments of the present disclosure.

The second communication node further includes a communication apparatus 73, an input apparatus 74 and an output apparatus 74.

The processor 71, the memory 72, the communication apparatus 73, the input apparatus 74 and the output apparatus 75 in the second communication node may be connected via a bus or in other manners, and the connection via a bus is taken as an example in FIG. 7.

The input apparatus 74 may be configured to receive input digital or character information and generate key signal input related to user settings and function control of the second communication node. The output apparatus 75 may include a display screen and other display devices.

The communication apparatus 73 may include a receiver and a transmitter. The communication apparatus 73 is configured to perform information transceiving communication according to the control of the processor 71.

The memory 72, as a computer-readable storage medium, may be configured to store software programs and computer-executable programs and modules, such as program instructions/modules (such as the first reception module 51, the determination module 52 and the feedback module 53 in the information feedback device) corresponding to the information feedback method of the embodiments of the present application. The memory 72 may include a program storage region and a data storage region, where the program storage region may store an operating system and an application program required by at least one function while the data storage region may store data created depending on use of a device. Additionally, the memory 72 may include a high-speed random-access memory and may further include a non-volatile memory, for example, at least one magnetic disk memory element, a flash memory element or another non-volatile solid-state memory element. In some examples, the memory 72 may include memories which are remotely disposed with respect to the processor 71, and these remote memories may be connected to the second communication node via a network. The examples of the preceding network include, but are not limited to, the Internet, an intranet, a local area network, a mobile communication network and a combination thereof.

Figure 8:
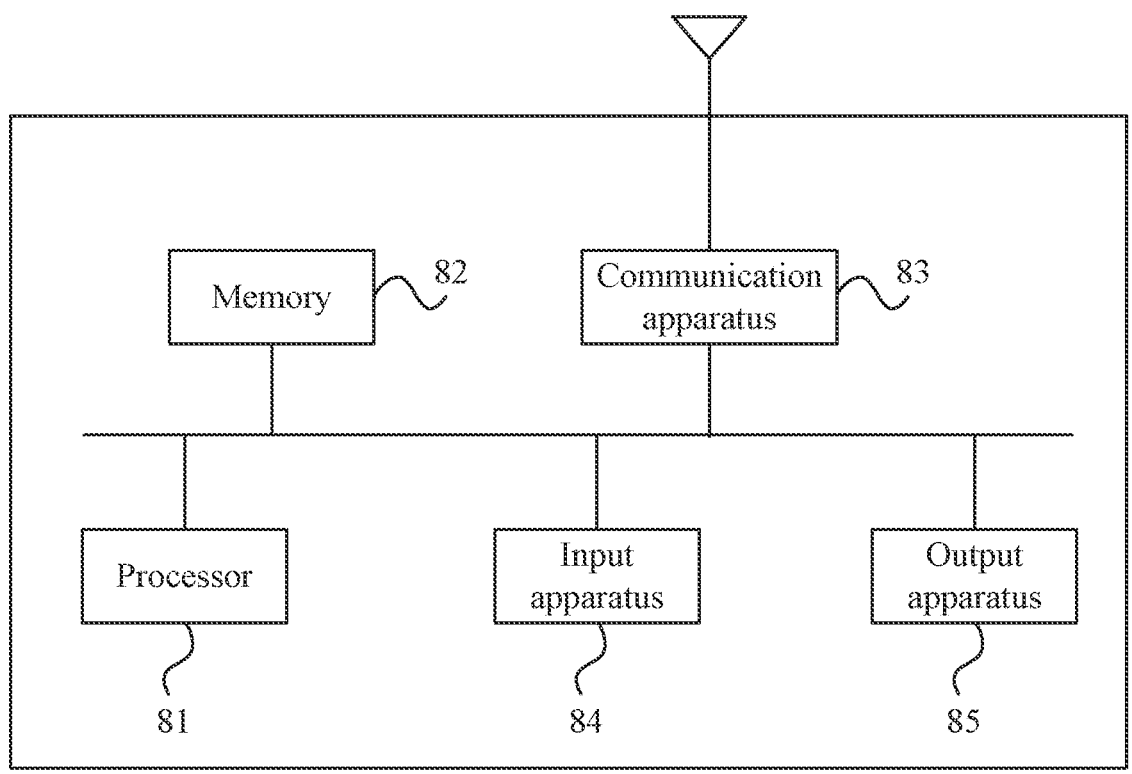
FIG. 8 is a structural diagram of a first communication node according to the present application.

The embodiment of the present application further provides a first communication node. FIG. 8 is a structural diagram of a first communication node according to the present application. As shown in FIG. 8, the first communication node provided by the present application includes one or more processors 81 and a memory 82. One or more processors 81 may be provided in the first communication node, and one processor 81 is taken as an example in FIG. 8. The memory 82 is configured to store one or more programs. The one or more programs, when executed by the one or more processors 81, cause the one or more processors 81 to implement the information receiving method of the embodiments of the present disclosure.

The first communication node further includes a communication apparatus 83, an input apparatus 84 and an output apparatus 85.

The processor 81, the memory 82, the communication apparatus 83, the input apparatus 84 and the output apparatus 75 in the first communication node may be connected via a bus or in other manners, and the connection via a bus is taken as an example in FIG. 8.

The input apparatus 84 may be configured to receive input digital or character information and generate key signal input related to user settings and function control of the second communication node. The output apparatus 85 may include a display screen and other display devices.

The communication apparatus 83 may include a receiver and a transmitter. The communication apparatus 83 is configured to perform information transceiving communication according to the control of the processor 81.

The memory 82, as a computer-readable storage medium, may be configured to store software programs and computer-executable programs and modules, such as program instructions/modules (such as the sending module 61 and the second reception module 62 in the information receiving device) corresponding to a location information determination method of the embodiments of the present application. The memory 82 may include a program storage region and a data storage region, where the program storage region may store an operating system and an application program required by at least one function while the data storage region may store data created depending on use of a device. Additionally, the memory 82 may include a high-speed random-access memory and may further include a non-volatile memory, for example, at least one magnetic disk memory element, a flash memory element or another non-volatile solid-state memory element. In some examples, the memory 82 may include memories which are remotely disposed with respect to the processor 81, and these remote memories may be connected to the first communication node via a network. The examples of the preceding network include, but are not limited to, the Internet, an intranet, a local area network, a mobile communication network and a combination thereof.

The embodiment of the present application further provides a storage medium. The storage medium is configured to store a computer program which, when executed by a processor, implements the information feedback method and information receiving method of any embodiment of the present application, for example, the information feedback method applied to the second communication node and the information receiving method applied to the first communication node.

The information feedback method applied to the second communication node includes the following.

Configuration information sent by a first communication node is received.

Precoding matrix information is determined according to the configuration information, where a target frequency band of the precoding matrix information is determined through indication information of a precoding matrix information subband, and the precoding matrix information subband is determined according to the configuration information.

The precoding matrix information is fed back to the first communication node.

The information receiving method applied to the first communication node includes the following.

Configuration information is sent to a second communication node.

Precoding matrix information fed back by the second communication node is received, where a target frequency band of the precoding matrix information is determined through indication information of a precoding matrix information subband, and the precoding matrix information subband is determined according to the configuration information.

The above are only exemplary embodiments of the present application and are not intended to limit the scope of the present application.

It is to be understood by those skilled in the art that the term "terminal" covers any suitable type of wireless user devices, such as a mobile phone, a portable data processing apparatus, a portable web browser or a vehicle-mounted mobile station.

In general, multiple embodiments of the present application may be implemented in hardware or a special-purpose circuit, software, logic, or any combination thereof. For example, some aspects may be implemented in hardware while other aspects may be implemented in firmware or software that may be executed by a controller, a microprocessor or other computing apparatuses, although the present application is not limited thereto.

The embodiments of the present application may be implemented by a data processor of a mobile apparatus executing computer program instructions. The implementation, for example, may be in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules and functions, or may represent a combination of program steps, logic circuits, modules and functions. The computer program may be stored in a memory. The memory may be of any type suitable to the local technical environment and may be implemented by using any suitable data storage technology. For example, the memory may be, but is not limited to, a read-only memory (ROM), a random-access memory (RAM), an optical memory apparatus and system (a digital video disc (DVD) or a compact disc (CD)), or the like. The computer-readable storage medium may include a non-transitory storage medium. The data processor may be of any type suitable to the local technical environment, such as, but is not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. An information feedback method, comprising:
   receiving configuration information from a first communication node;
   determining precoding matrix information according to the configuration information, wherein a target frequency band of the precoding matrix information comprises a precoding matrix information subband, and the precoding matrix information subband is determined according to the configuration information; and
   feeding back the precoding matrix information to the first communication node;
   wherein the configuration information comprises: a target frequency band of channel state information, wherein the target frequency band of the channel state information is indicated in a manner of a channel state information subband, and the precoding matrix information subband is within the channel state information subband; and
   wherein the precoding matrix information subband is determined according to the configuration information comprises: determining a width of the precoding matrix information subband according to a width of the channel state information subband.

2. The method according to claim 1, wherein determining the width of the precoding matrix information subband according to the width of the channel state information subband comprises:
   determining a width of a first precoding matrix information subband within a bandwidth part (BWP) according to a width of a first channel state information subband within the BWP, wherein the bandwidth part comprises at least one subband.

3. The method according to claim 2, wherein determining the width of the first precoding matrix information subband within the BWP according to the width of the first channel state information subband within the BWP comprises:
   configuring the width of the first precoding matrix information subband within the BWP to be equal to the width of the first channel state information subband within the BWP.

4. The method according to claim 2, wherein determining the width of the first precoding matrix information subband within the BWP according to the width of the first channel state information subband within the BWP comprises:
   determining the width of the first precoding matrix information subband within the BWP according to a comparison result between the width of the first channel state information subband within the BWP and a width of a middle precoding matrix information subband, wherein the middle precoding matrix information subband is a non-first precoding matrix information subband and a non-last precoding matrix information subband within the BWP.

5. The method according to claim 2, wherein determining the width of the first precoding matrix information subband within the BWP according to the width of the first channel state information subband within the BWP comprises:
   determining the width of the first precoding matrix information subband within the BWP according to a comparison result between the width of the first channel state information subband within the BWP and a width of a middle channel state information subband, wherein the middle channel state information subband is a non-first channel state information subband and a non-last channel state information subband within the BWP.

6. The method according to claim 1, wherein determining the width of the precoding matrix information subband according to the width of the channel state information subband comprises:
   determining a width of a last precoding matrix information subband within a BWP according to a width of a last channel state information subband within the BWP.

7. The method according to claim 6, wherein determining the width of the last precoding matrix information subband within the BWP according to the width of the last channel state information subband within the BWP comprises:
   configuring the width of the last precoding matrix information subband within the BWP to be equal to the width of the last channel state information subband within the BWP.

8. The method according to claim 6, wherein determining the width of the last precoding matrix information subband within the BWP according to the width of the last channel state information subband within the BWP comprises:
   determining the width of the last precoding matrix information subband within the BWP according to a comparison result between the width of the last channel state information subband within the BWP and a width of a middle precoding matrix information subband.

9. The method according to claim 6, wherein determining the width of the last precoding matrix information subband within the BWP according to the width of the last channel state information subband within the BWP comprises:
   determining the width of the last precoding matrix information subband within the BWP according to a comparison result between the width of the last channel state information subband within the BWP and a width of a middle channel state information subband.

10. The method according to claim 1, wherein
   the configuration information further comprises: a frequency domain starting point of a BWP; and
   the precoding matrix information subband is determined according to the configuration information comprises: determining a width of a first precoding matrix information subband within the BWP according to the frequency domain starting point of the BWP and a width of a middle precoding matrix information subband.

11. The method according to claim 1, wherein
   the configuration information further comprises: a frequency domain termination point of a BWP; and
   the precoding matrix information subband is determined according to the configuration information comprises: determining a width of a last precoding matrix information subband within the BWP according to the frequency domain termination point of the BWP and a width of a middle precoding matrix information subband.

12. The method according to claim 1, wherein
   the configuration information further comprises: a configuration density of a reference signal; and
   the precoding matrix information subband is determined according to the configuration information comprises: determining a width of the precoding matrix information subband according to the configuration density of the reference signal.

13. The method according to claim 1, wherein the precoding matrix information subband is determined according to the configuration information comprises:
   determining a width of a first precoding matrix information subband within a BWP according to a first-type density of a reference signal, wherein
   the first-type density refers to a density of a reference signal within a first precoding matrix information subband determined by a width of a first-type precoding matrix information subband; and
   the width of the first-type precoding matrix information subband is a difference between a width of a first channel state information subband within the BWP and a width of a middle precoding matrix information subband or the width of the first-type precoding matrix information subband is a modulo operation result of a width of a first channel state information subband within the BWP and a width of a middle precoding matrix information subband; the middle precoding matrix information subband is a non-first one and a non-last one of a plurality of precoding matrix information subbands within the BWP.

14. A non-transitory computer-readable storage medium, which is configured to store a computer program which, when executed by a processor, implements the information feedback method of claim 1.

15. An information receiving method, comprising:
   sending configuration information to a second communication node; and
   receiving precoding matrix information fed back from the second communication node, wherein a target frequency band of the precoding matrix information comprises a precoding matrix information subband, and the precoding matrix information subband is determined according to the configuration information;
   wherein the configuration information comprises: a target frequency band of channel state information, wherein the target frequency band of the channel state information is indicated in a manner of a channel state information subband, and the precoding matrix information subband is within the channel state information subband; and
   wherein the precoding matrix information subband is determined according to the configuration information comprises: determining a width of the precoding matrix information subband according to a width of the channel state information subband.

16. The method according to claim 15, after receiving the precoding matrix information fed back by the second communication node, further comprising:
   determining a transmission scheme for to-be-transmitted data according to the precoding matrix information.

17. A communication node, comprising:
   one or more processors; and
   a memory, which is configured to store one or more programs;
   wherein the one or more programs are executed by the one or more processors to cause the one or more processors to implement the information receiving method of claim 15.

18. A communication node, comprising:
   one or more processors; and
   a memory, which is configured to store one or more programs;
   wherein the one or more programs are executed by the one or more processors to cause the one or more processors to:
   receive configuration information from a first communication node;
   determine precoding matrix information according to the configuration information, wherein a target frequency band of the precoding matrix information comprises a precoding matrix information subband, and the precoding matrix information subband is determined according to the configuration information; and
   feed back the precoding matrix information to the first communication node;
   wherein the configuration information comprises: a target frequency band of channel state information, wherein the target frequency band of the channel state information is indicated in a manner of a channel state information subband, and the precoding matrix information subband is within the channel state information subband; and
   wherein the one or more processors are configured to determine a width of the precoding matrix information subband according to a width of the channel state information subband.

* * * * *